May 27, 1924.
J. M. STRAUB
METHOD OF MAKING CUSHION TIRES
Filed Dec. 1, 1922
1,495,362
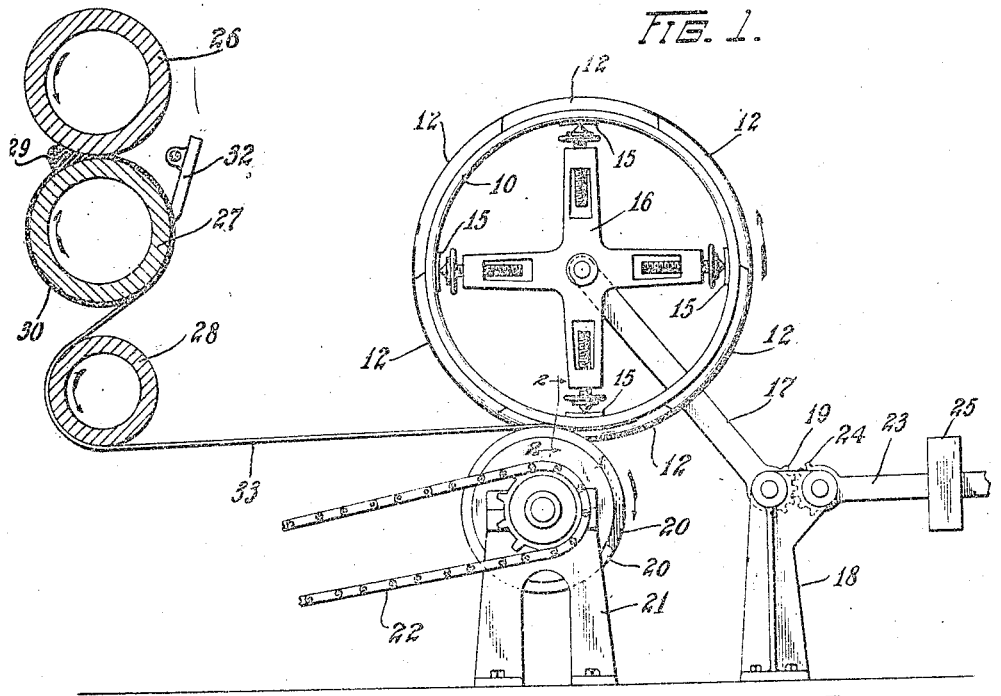
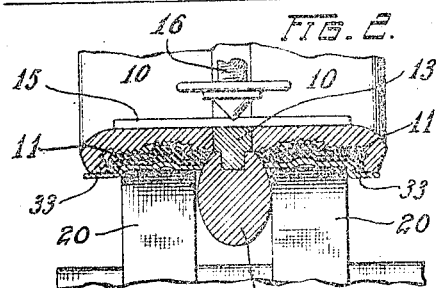
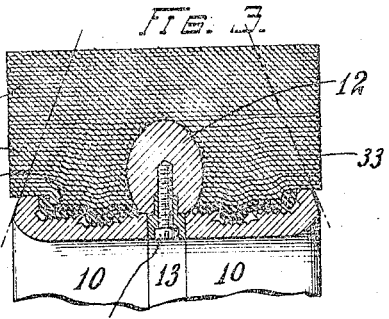
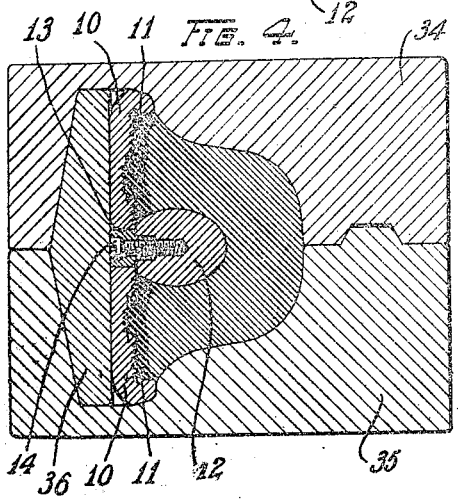
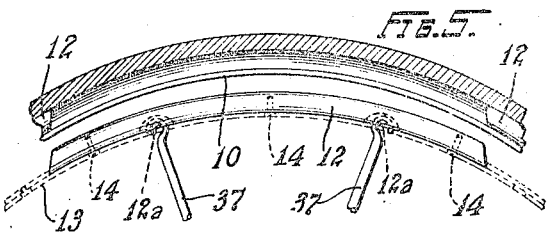
Inventor,
John M. Straub
By Robert M. Pierson
Atty.

Patented May 27, 1924.

1,495,362

UNITED STATES PATENT OFFICE.

JOHN M. STRAUB, OF AKRON, OHIO, ASSIGNOR TO THE B. F. GOODRICH COMPANY, OF NEW YORK, N. Y., A CORPORATION OF NEW YORK.

METHOD OF MAKING CUSHION TIRES.

Application filed December 1, 1922. Serial No. 604,204.

*To all whom it may concern:*

Be it known that I, JOHN M. STRAUB, a citizen of the United States, residing at Akron, in the county of Summit and State of Ohio, have invented a certain new and useful Method of Making Cushion Tires, of which the following is a specification.

This invention relates to methods and apparatus for making cushion tires comprising a hollow tire-body secured upon a rigid base, and its object is to provide an improved method and improved apparatus whereby a tire of this type may be rapidly, economically, and accurately constructed, this application being a continuation in part of my application Serial No. 523,332, filed December 19, 1921 on apparatus for making cushion tires.

Of the accompanying drawings:
Fig. 1 is a side elevation of apparatus, including a calender, embodying and adapted to carry out my invention, the calender being shown diagrammatically.

Fig. 2 is a fragmentary section on line 2—2 of Fig. 1.

Fig. 3 is a cross-section of the tire structure, with parts of the apparatus associated therewith, as it appears at one stage of my method.

Fig. 4 is a cross-section of a vulcanizing mold with the tire and associated members therein.

Fig. 5 is a fragmentary, longitudinal section of the finished tire, showing core sections in process of being removed therefrom, and means for so removing them.

Referring to the drawings, 10, 10 are a pair of annular tire-base members or rings, constituting, in a sense, a part of the apparatus but adapted to constitute the rim or base of the finished tire, each of them being formed on its outer periphery with under-cut grooves adapted to anchor a foundation layer 11 of hard rubber such as is commonly used in solid tires to secure the soft rubber tire-body or cushion to the metal tire-base.

In building the tire said rings are assembled with a core structure, here shown as a complete annulus, composed of core sections 12, 12, said sections being formed at their inner sides with recesses spanned by anchor pins 12ª, 12ª (Fig. 5), and said sections being held in assembled relation by arcuate bars 13, 13 secured to the inner sides of the core sections by screws 14, 14. The rings 10 are presented to the respective sides of said bars, as shown clearly in Fig. 2, with the annular core projecting from their outer peripheries, and said rings are frictionally held in such relation with the bars and the core sections by transverse bridge plates 15, 15 (Figs. 1 and 2) engaged by respective arms of a spider 16, the latter being journaled at the free end of a lever 17 pivoted on a standard 18 (Fig. 1) and formed with a gear segment 19 concentric with its pivot, the rings 10, so mounted upon the spider, being adapted to ride upon respective presser rolls 20, 20 spaced apart to accommodate the core sections 12, said rolls being journaled, adjacent a calender, upon a pair of standards, one of which is shown at 21 (Fig. 1), and adapted to be driven from said calender by a sprocket chain 22.

For supplementing the weight of the tire-base assembly, to press the same against the rolls 20, a lever 23 is pivoted on the standard 18, formed with a gear segment 24 meshed with the gear segment 19 of the lever 17, and provided with a weight 25.

The rolls of the calender are shown at 26, 27 and 28 (Fig. 1). 29 is a bank of rubber thereon, being formed into a sheet 30 on the middle roll 27, and 32 is one of a set of slitters or calender knives adapted to slit the sheet 30 to produce continuous strips of stock 33, 33 (Figs. 1 and 2) suitable to be drawn onto the respective base-members 10 in successive, superimposed convolutions to build up a tire-body thereon.

Referring to Fig. 4, 34, 35 are the sections of a mold such as is commonly used for vulcanizing solid tires, 36 is the usual wedging ring therefor, and, in Fig. 5, 37, 37 are hooks adapted to engage the pins 12ª, 12ª for pulling the core-sections 12 from the finished tire.

In practicing my method with the apparatus here described, the rings 10, core sections 12, bars 13 and bridge plates 15 are assembled upon the spider 16, as clearly shown in Figs. 1 and 2, and the layers of hard rubber compound, 11, are pressed onto said rings and into the undercut grooves thereof, preferably by the method which will now be described with respect to the soft rubber compound constituting the cushion or main portion of the tire body, and with apparatus similar to that here shown.

Assuming the hard rubber layers to have been applied, which is preferably done at another calender, on which hard rubber stock is kept running, the tire-base assembly, with the hard rubber stock thereon, is mounted upon the lever 17 and rolls 20, as shown in Fig. 1, said rolls being driven from the calender and in turn driving the tire-base assembly, and, the knives 32 being appropriately set, the strips 33 are drawn from the calender by hand and started upon the respective tire-base members 10, on each side of the core sections 12. The rotation of the tire-base assembly thereafter continuously draws said strips onto the respective rings 10 in successive convolutions, the rolls 20 pressing the stock firmly thereon, until the stock has been built up, on each side of the annular core, approximately to its outer periphery, after which the winding of the stock is continued with a unitary strip 33ª laterally extending across the crown of the core, until the stock has been built up to the form shown in Fig. 3. This may be done by discontinuing one of the strips 33 and adjusting the knives 32 to widen the other strip, the latter being guided medially onto the tire structure and a suitable single roll (not shown) preferably being substituted for the rolls 20, or the partly built tire structure may be removed to similar apparatus adapted to provide and apply the single strip.

The tire structure being built up, as described, to the condition shown in Fig. 3, the excess cushion rubber is trimmed therefrom, on the dot-and-dash lines there shown, to give approximately the cross-sectional shape desired in the finished tire and so adapt the tire-structure to be received by the mold, 34, 35, 36, into which it is then placed, with the core still in it. The tire is then vulcanized in said mold, after which it is removed therefrom, certain of the screws 14 are removed to disconnect the core sections 12, and the latter are then pulled from the finished tire, by means of the hooks 37, leaving therein an annular void which enhances the cushioning characteristics of the tire.

Modifications may be resorted to within the scope of my invention, and I do not wholly limit my claims to the specific construction or procedure shown and described.

I claim:

1. The method of producing a tire of the class described comprising the following steps: (*a*) winding a bifurcated strip upon an annular rim on either side of an annular support to the depth of said support; (*b*) continuing the winding with a unitary strip to the completion of the operation; (*c*) vulcanizing the structure; (*d*) removing the annular support.

2. The method of producing a tire of the class described comprising the following steps: (*a*) winding a separated strip of uncured rubber upon an annular rigid ring having a projection thereon adapted to separate and support said strip; (*b*) continuing the winding with a unitary strip; (*c*) vulcanizing the structure interiorly supported against collapse; (*d*) removing the interior support.

3. The method of producing a tire of the class described comprising the following steps: (*a*) winding unvulcanized strips upon a rim having thereon an annular exteriorly projecting support whereby the material is laid up on either side of said support to the full depth thereof; (*b*) thereafter winding further material thereon to completely cover said support; (*c*) vulcanizing the structure interiorly supported; (*d*) removing the interior support whereby a void is left in the completed structure.

4. The method of producing a tire of the class described comprising the following steps: (*a*) winding unvulcanized strips of material upon a rotating ring direct from a calender whereby the strip is first separated to form dual annuluses spaced apart and laterally supported by an annular projection on the rim; (*b*) continuing the winding radially outwardly of said support with a unitary strip; (*c*) vulcanizing the interiorly supported structure; (*d*) removing the interior support whereby an annular void is maintained interiorly of the structure adjacent the base rim.

In witness whereof I have hereunto set my hand this 24 day of November, 1922.

JOHN M. STRAUB.